US012516648B2

(12) United States Patent
McDavid et al.

(10) Patent No.: US 12,516,648 B2
(45) Date of Patent: Jan. 6, 2026

(54) ENGINE SYSTEM, PISTON, AND OPERATING METHOD FOR PSEUDO-TUMBLE MIXING OF HYDROGEN FUEL AND AIR

(71) Applicant: Caterpillar Inc., Peoria, IL (US)

(72) Inventors: Robert Michael McDavid, Dunlap, IL (US); Jonathan William Anders, Peoria, IL (US); Diego Bernardi Bestel, Naperville, IL (US); Chad P. Koci, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 18/752,063

(22) Filed: Jun. 24, 2024

(65) Prior Publication Data

US 2025/0389236 A1    Dec. 25, 2025

(51) Int. Cl.
*F02M 21/02*    (2006.01)
*F02F 3/28*    (2006.01)

(52) U.S. Cl.
CPC ........... *F02M 21/0206* (2013.01); *F02F 3/28* (2013.01); *F02M 21/0275* (2013.01)

(58) Field of Classification Search
CPC .... F02M 21/0206; F02M 21/0275; F02F 3/28
See application file for complete search history.

(56) References Cited

U.S. PATENT DOCUMENTS 6,997,158 B1 * 2/2006 Liu ..................... F02B 23/0672
                                                     123/307
7,438,039 B2   10/2008 Poola et al.
9,938,888 B2   4/2018 Huang et al.
11,168,641 B2  11/2021 Matsubara et al.
11,519,359 B1 * 12/2022 Ravisankar ............... F02F 3/28
11,840,984 B2 * 12/2023 Eismark .................. F02M 21/02
11,959,414 B2  4/2024 Shroeder et al.
(Continued)

FOREIGN PATENT DOCUMENTS

CN    105518274 A  *  4/2016  .......... F02B 23/0624
CN    212479397 U  *  2/2021  .......... F02B 23/0624
(Continued)

OTHER PUBLICATIONS

Machine Translation of WO 2009068582 A1 PDF File Name: "WO2009068582A1_Machine_Translation.pdf" (Year: 2009).*
(Continued)

*Primary Examiner* — Lindsay M Low
*Assistant Examiner* — Ruben Picon-Feliciano
(74) *Attorney, Agent, or Firm* — Brannon Sowers & Cracraft PC

(57) ABSTRACT

Operating an engine includes moving a piston toward a top-dead-center position in a cylinder, and directly injecting a gaseous hydrogen fuel into the cylinder in an injection path targeting a center cone in a combustion bowl of the piston. The gaseous hydrogen fuel is impinged upon an outer cone surface, and fluids advanced upwardly along a reentrant bowl wall toward a bowl throat opening. Squished fluids are advanced from a squish volume into the reentrant bowl throat, to produce a combined mixing flow of the advanced fluids and the squished fluids around a flow axis extending circumferentially around a piston center axis. Related apparatus is also disclosed.

20 Claims, 2 Drawing Sheets

(56) References Cited

U.S. PATENT DOCUMENTS

2011/0253096 A1* 10/2011 Easley ............... F02B 23/0624
                                                         123/294
2022/0074366 A1*  3/2022 Primus ............... F02B 23/0687

FOREIGN PATENT DOCUMENTS

| GB | 2615326 A | 8/2023 | |
|----|-----------|--------|---|
| JP | 4682452 B2 | 5/2011 | |
| WO | WO-2009068582 A1 * | 6/2009 | ......... F02B 23/0672 |
| WO | 2023067117 A2 | 4/2023 | |
| WO | 2023218308 A1 | 11/2023 | |

OTHER PUBLICATIONS

Machine Translation of CN105518274A PDF File Name: "CN105518274A_Machine_Translation.pdf" (Year: 2016).*

Machine Translation of CN 212479397 U PDF File Name: "CN212479397U_Machine_Translation.pdf" (Year: 2021).*

* cited by examiner

ENGINE SYSTEM, PISTON, AND OPERATING METHOD FOR PSEUDO-TUMBLE MIXING OF HYDROGEN FUEL AND AIR

FEDERALLY SPONSORED RESEARCH OR DEVELOPMENT

This invention was made with government support under (DE-EE0010606) awarded by United States Department of Energy. The government has certain rights in the invention.

TECHNICAL FIELD

The present disclosure relates generally to a gaseous fuel engine system, and more particularly to a piston in a gaseous fuel engine system configured for improved mixing flow of a gaseous fuel and air.

BACKGROUND

Internal combustion engines are well-known and widely used throughout the world for many purposes including operation of drivelines in land vehicles and marine vessels, as well as powering of pumps, compressors, and electrical generators to name a few examples. In recent years, engineering resources have been increasingly directed at the development of engine platforms operated on so-called alternative fuels considered to produce fewer undesired emissions as compared to traditional fuels such as diesel, gasoline, and natural gas.

One fuel type now receiving significant commercial and technical interest is gaseous hydrogen fuel as well as various gaseous fuel blends containing gaseous molecular hydrogen. Hydrogen is relatively easy to ignite and has a very rapid flame speed as compared to many hydrocarbon fuels. Since engines are traditionally designed to operate on a single fuel or relatively narrow range of fuel types, adapting engine systems to hydrogen or hydrogen blends has created a host of new challenges ranging from combustion phasing and control to fuel handling and storage to lubrication and thermal management. With regard to ignitability, it has been observed that relatively thorough mixing of hydrogen fuel with air can provide benefits respecting predictability of ignition and avoidance of undesired forms and/or manner of combustion. While such insights alone represent some progress, various obstacles to exploiting gaseous hydrogen to its full theoretical potential nevertheless remain and will likely be with us for some time. One known engine arrangement including a piston apparently optimized for hydrogen fuels is known from U.S. Pat. No. 11,959,414B1 to Shroeder et al.

SUMMARY

In one aspect, a method of operating an engine includes moving a piston defining a piston center axis in a compression stroke toward a top-dead-center position in a cylinder in an engine, and directly injecting a gaseous hydrogen fuel into the cylinder in an injection path targeting a center cone in a combustion bowl of the piston defining a bowl max radius dimension. The method further includes advancing fluids including impinged gaseous hydrogen fuel upwardly from a bowl floor along a reentrant bowl wall toward a bowl throat opening defining a throat radius dimension that is from 50% to 80% of the bowl max radius dimension. The method further includes advancing squished fluids from a squish volume between a piston rim of the piston and a cylinder head of the engine into the bowl throat opening, and producing a combined mixing flow of the advanced fluids and the squished fluids around a flow axis extending circumferentially around the piston center axis.

In another aspect, an engine system includes a gaseous fuel supply, an engine housing forming a cylinder, and a piston within the cylinder movable between a bottom-dead-center position and a top-dead-center position. The piston defines a piston center axis and includes a piston rim extending circumferentially around a combustion bowl, a center cone within the combustion bowl, a bowl floor, and a reentrant bowl wall extending to a bowl edge defining a bowl throat opening. The piston defines a bowl max radius dimension and a throat radius dimension that is from 50% to 80% of the bowl max radius dimension. The engine system further includes a fuel injector fluid coupled to the gaseous fuel supply and extending into the cylinder. The fuel injector includes at least one fuel outlet hole oriented to target the center cone of the piston.

In still another aspect, a piston for an internal combustion engine includes a piston crown having a piston outer surface extending circumferentially around a piston center axis, and a piston rim extending circumferentially around a combustion bowl, a center cone within the combustion bowl, a bowl floor, and a bowl outer wall extending reentrantly to a bowl edge defining a bowl throat. The piston defines a bowl max radius dimension extending from the piston center axis to the bowl outer wall, a throat radius dimension extending from the piston center axis to the bowl edge, and a piston radius dimension. The throat radius dimension is from 50% to 80% of the bowl max radius dimension, and from 40% to 70% of the piston radius dimension.

DETAILED DESCRIPTION

Figure 1:
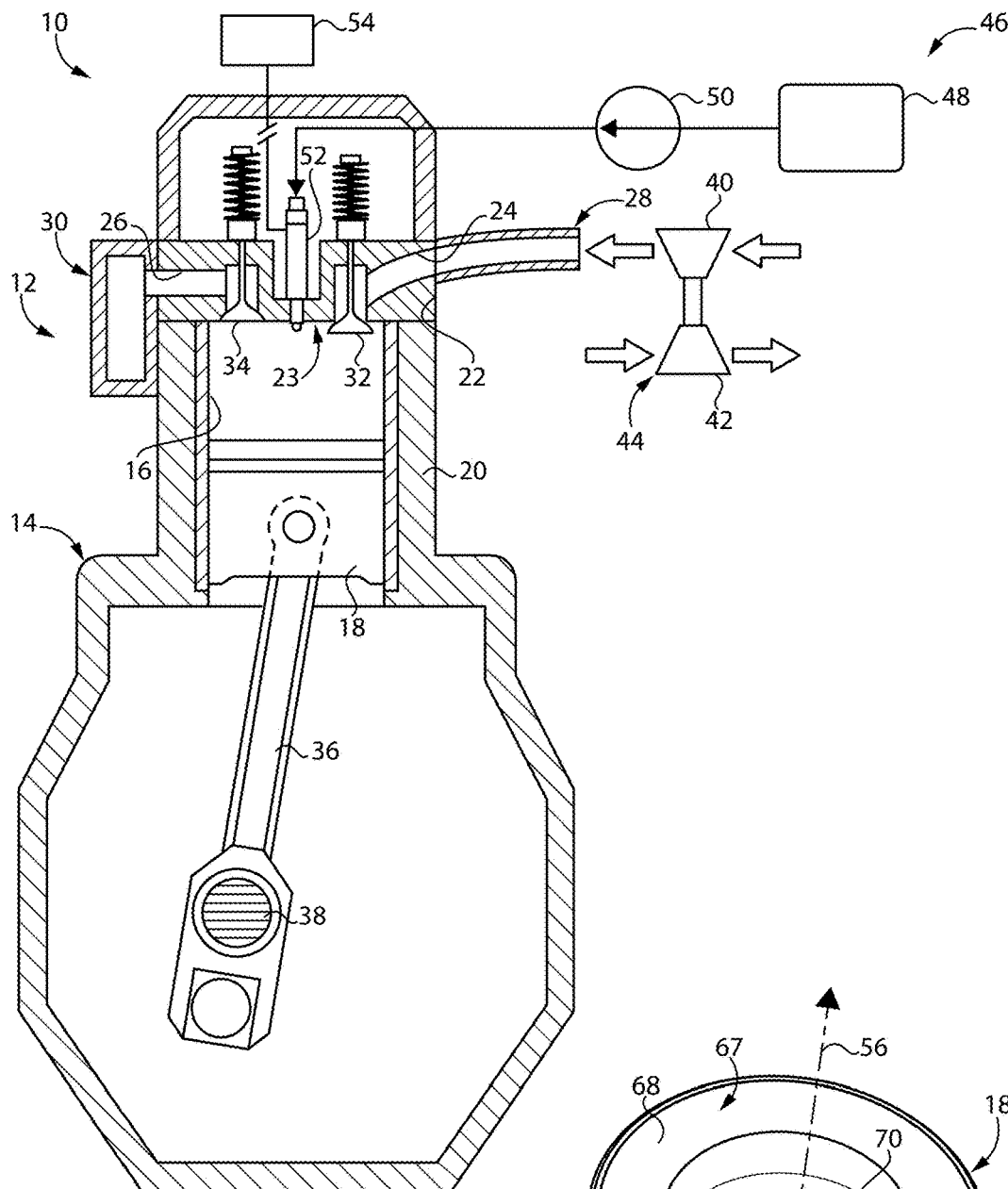
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 forming a cylinder 16. One cylinder is illustrated in FIG. 1. It will nevertheless be appreciated that engine 12 could include any number of cylinders in any suitable arrangement such as an inline pattern, a V-pattern, or still another. A piston 18 is within cylinder 16 and movable between a bottom-dead-center position and a top-dead-center position, typically in a four-stroke engine cycle.

Engine housing 14 includes a cylinder block 20 wherein cylinder 16 is formed, and a cylinder head 22 attached to cylinder block 20. Cylinder head 22 may include a fireside surface 23 that is planar and exposed to cylinder 16. Those skilled in the art will be familiar with pent roof and hemispheric cylinder head designs. The present disclosure is not strictly limited respecting the planar configuration of fireside surface 23, however, such an arrangement provides one practical implementation strategy.

An intake port 24 is shown extending through cylinder head 22 to cylinder 16. An intake valve 32, typically one of two intake valves, is movable to open and close fluid communications between intake port 24 and cylinder 16. An exhaust port 26 also extends through cylinder head 22, and an exhaust valve 34, again typically one of two, is movable to open and close fluid communications between cylinder 16 and exhaust port 26. An exhaust manifold 30 is fluid connected to exhaust port 26, and an intake manifold 28 is fluid connected to intake port 24. A compressor 40 in a turbocharger 44 pressurizes a feed of intake air fed through intake manifold 28. A flow of exhaust rotates a turbine 42 in turbocharger 44 coupled to compressor 40. Multi-stage turbochargers, electric-assist turbochargers, superchargers, and other equipment are within the scope of the present disclosure. A connecting rod 36 is coupled between piston 18 and a crankshaft 38 to rotate a load such as an electrical generator, a pump, a compressor, or a driveline in a vehicle to name a few examples.

Figure 2:
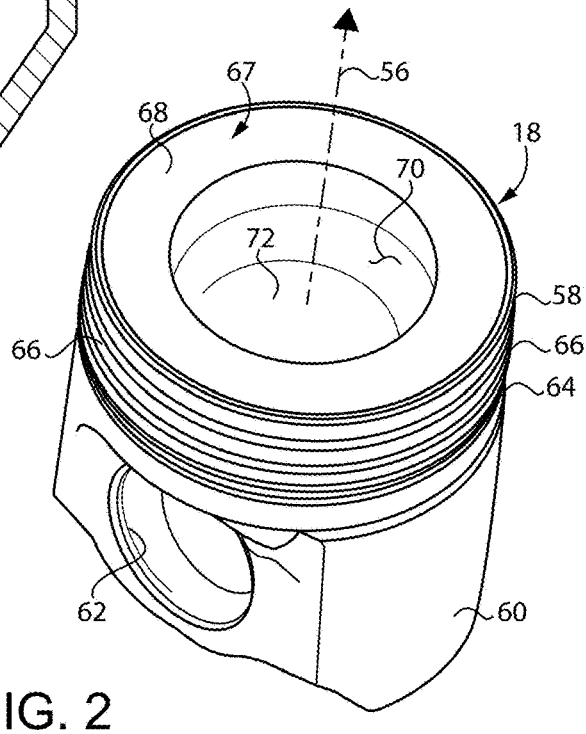
FIG. 2 is a diagrammatic view of a piston, according to one embodiment.

Referring also now to FIG. 2, there are shown further features of piston 18. Piston 18 includes a piston crown 58 attached to a piston skirt 60. A wrist pin bore 62 is formed in piston skirt 60 for coupling via a wrist pin to connecting rod 36. Piston crown 58 includes a crown outer surface or a piston outer surface 64 extending circumferentially around a piston center axis 56. Piston ring grooves 66 may be formed in piston outer surface 64. Piston crown 58 further includes a combustion face 67 exposed to cylinder 16. Combustion face 67 includes a piston rim 68 extending circumferentially around a combustion bowl 70. Combustion face 67 further forms a center cone 72 within combustion bowl 70. As will be further apparent from the following description, piston 18 is uniquely configured to improve mixing of fluids in cylinder 16 during engine operation.

Returning to FIG. 1, engine system 10 further includes a fuel system 46. Fuel system 46 includes a gaseous fuel supply 48, and at least one pump 50. Fuel system 46 further includes a fuel injector 52 fluid coupled to gaseous fuel supply 48 and extending into cylinder 16. Fuel injector 52 includes at least one fuel outlet hole, further discussed herein, oriented to target center cone 72 of piston 18. It will be appreciated that the at least one fuel outlet hole will typically be oriented to target center cone 72 at a range of crank angles. Fuel injection may occur when piston 18 is at or within a few degrees of the top-dead-center position. Other embodiments might inject the fuel prior to the top-dead-center position, including at 30°, 60°, 90°, 180°, before top-dead-center, or perhaps starting injection even slightly more than 180° before top-dead-center and before the intake valve closes. The precise orientation of fuel holes so as to target center cone 72 can vary dependent upon the desired timing of injection. Fuel system 46 further includes an electronic control unit or ECU 54 electrically connected to fuel injector 52 and structured, typically by way of opening a fuel admission valve or adjusting a control valve coupled to a fuel admission valve in fuel injector 52, to control start of fuel injection and end of fuel injection, also potentially controlling a manner of fuel injection such as a fuel injection rate or injection number in a given engine cycle.

In a practical implementation, gaseous fuel supply 48 contains a gaseous hydrogen fuel. The gaseous hydrogen fuel may include gaseous molecular hydrogen, as well as various blends including potentially gaseous molecular hydrogen blended with a hydrocarbon fuel such as natural gas. In an embodiment, gaseous molecular hydrogen and natural gas might be provided as a blended fuel blended on-board from separate fuel supplies for direct injection into cylinder 16 by way of fuel injector 52. Other embodiments contemplate direct injection of gaseous hydrogen fuel coupled with fumigation admission or port injection of a gaseous hydrocarbon fuel. A gaseous hydrogen fuel within the scope of the present disclosure means a gaseous hydrogen fuel where gaseous molecular hydrogen comprises at least a majority by volume.

Figure 3:
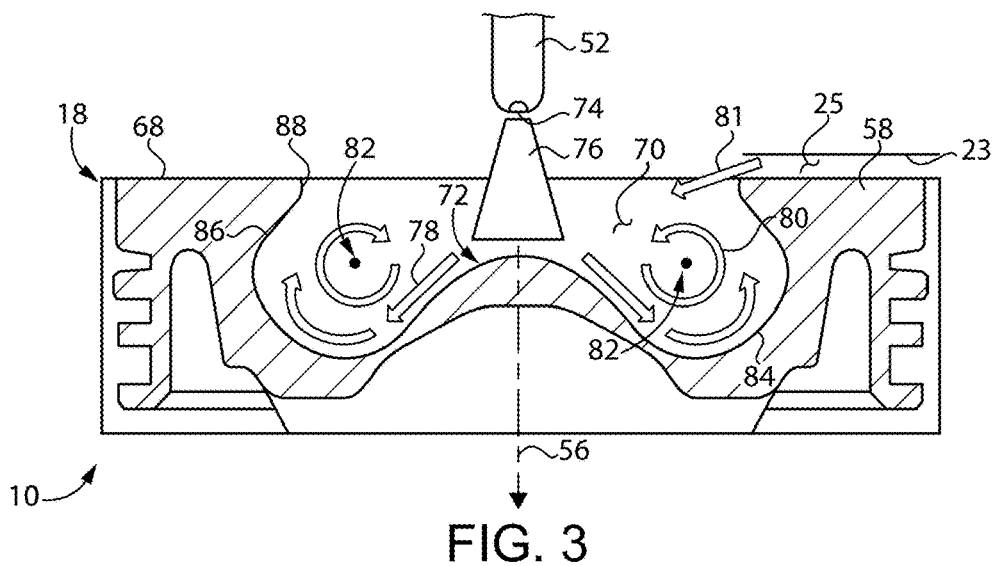
FIG. 3 is a sectioned side diagrammatic view of a portion of the engine system as in FIG. 1.
Figure 5:
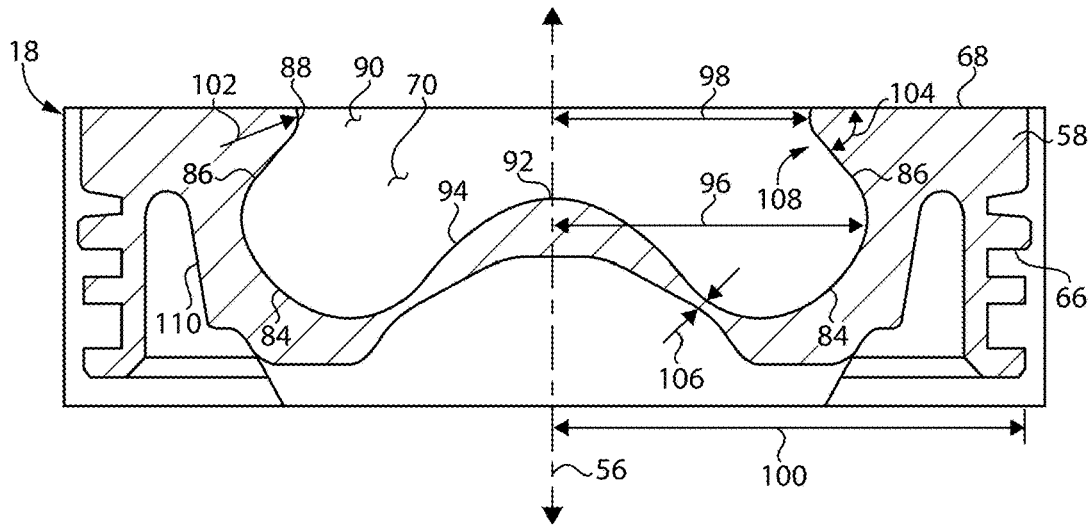
FIG. 5 is a sectioned side diagrammatic view of a piston, according to one embodiment.

Focusing now on FIG. 3 but also with reference to FIG. 5, there are depicted other features of engine system 10 and piston 18 in further detail. As noted above, piston 18 includes piston crown 58 defining piston center axis 56. Center cone 72 is within combustion bowl 70. Combustion bowl 70 further includes a bowl floor 84, and a bowl outer wall 86 that extends reentrantly to a bowl edge 88. Bowl edge 88 extends circumferentially and circularly around piston center axis 56 and defines a bowl throat opening 90. Center cone 72 may be roughly conical or hemispheric, for example, and thus the term "cone" as used herein should be understood in an illustrative sense not a strictly geometrically limiting sense. Center cone 72 includes a cone peak 92 and a cone slope 94 extending between cone peak 92 and bowl floor 84. Reentrant bowl wall 86 may extend to and include an upper wall surface 108. Upper wall surface 108 may be substantially linear in profile, and in three dimensions may itself be conical in shape. Piston rim 68 may be planar and extends planarly from piston outer surface 64 to bowl edge 88.

FIG. 3 also illustrates a fuel spray 76 extending outwardly from fuel outlet hole 74 of fuel injector 52. In the illustrated embodiment, fuel injector 52 includes a total of one fuel outlet hole 74. FIG. 3 also illustrates impinged fuel 78 that has impinged upon cone slope 94. Arrows radially outward in FIG. 3 of arrows 78 illustrate the flow of impinged fuel outwardly and upwardly along reentrant bowl wall 86. A squish volume 25 is shown defined between piston rim 68 and fireside surface 23. Squished fluids are shown at 81. A combined mixing flow of impinged fluids and squished fluids is shown at 80 and swirls in a generally toroidal pattern around a flow axis 82 extending circumferentially around piston center axis 56.

Figure 4:
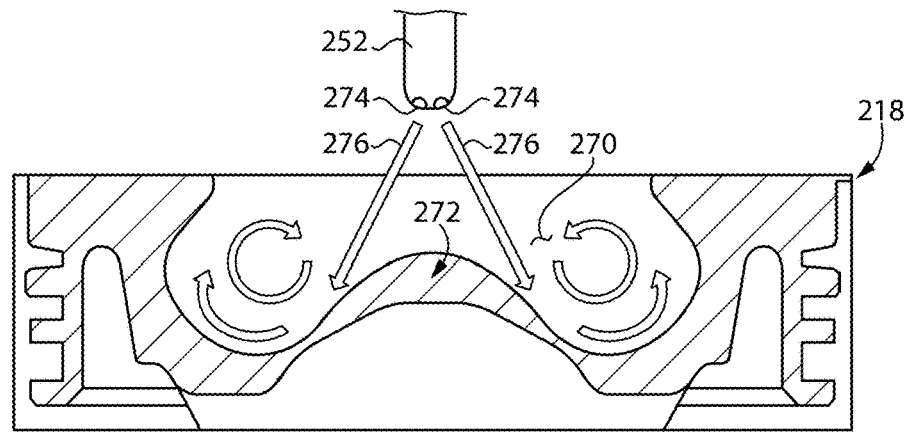
FIG. 4 is a sectioned side diagrammatic view of a portion of an engine system, according to another embodiment.

Referring to FIG. 4, there is shown a piston 218 including a combustion bowl 270 and configured generally analogously to piston 18. In the FIG. 4 embodiment a fuel injector 252 is shown having a plurality of fuel outlet holes 274 producing a plurality of jets of fuel 276 advanced outwardly for impingement upon a center cone 272 of piston 218. In one example embodiment, fuel injector 252 having a plurality of fuel outlet holes may be used for injecting gaseous hydrogen fuel at a relatively higher injection pressure. The embodiment of FIG. 3 utilizing fuel injector 52 may be used for injecting gaseous hydrogen fuel at a relatively lower injection pressure.

Focusing now on FIG. 5, there are shown additional dimensional and proportional attributes of piston 18. As discussed above, bowl edge 88 defines bowl throat opening 90. Piston 18 may further define a bowl max radius dimension 96 extending from piston center axis 56 to bowl outer wall 86. Piston 18 may also define a bowl throat radius dimension 98 that extends from piston center axis 56 to bowl edge 88. Piston 18 may also define a piston radius dimension 100. Piston 18, and combustion bowl 70 in particular, may be relatively highly reentrant compared to certain known combustion bowl designs. It is believed that the relatively large reentrancy of combustion bowl 70 can assist in producing a flow of mixing fluids generally as depicted in FIG. 3.

Those skilled in the art will be generally familiar with flow patterns in a cylinder generally referred to as tumbling. In certain known designs for liquid fuel engines, for example, tumbling flow can be achieved using a pent roof cylinder head design, with engine valves angularly oriented relative to a piston center axis to assist in introducing a flow of air that circulates somewhat back on itself within a cylinder. According to the present disclosure, "pseudo-tumbling" flow including a flow of fluids in an at least roughly toroidal pattern as is depicted in FIG. 3 can be achieved. It will be recalled gaseous hydrogen fuel is relatively easily ignitable, and thus strategies likely to result in rapid and substantial mixing of gaseous hydrogen fuel with air prior to ignition can be highly advantageous. In particular, achieving robust mixing of gaseous hydrogen fuel and air is believed to assist in reducing likelihood of hot spots, rapid localized ignition or other undesired combustion characteristics. Pseudo-tumbling flow can be achieved at least in part based upon dimensional and proportional attributes of piston 18 and other pistons within the scope of the present disclosure.

To this end, in an embodiment, bowl throat radius dimension 98 is from 50% to 80% of bowl max radius dimension 96. In a refinement, bowl throat radius dimension 98 may be 60% to 70% of bowl max radius dimension 96, and in a further refinement about 65%. Also in a practical implementation strategy, throat radius dimension 98 is from 40% to 70% of piston radius dimension 100. In a refinement, throat radius dimension 98 may be from 50% to 60% of piston radius dimension 100, and in a further refinement about 55%. As used herein the term "about" and like relative terms should be understood to mean generally or approximately as would be understood by a person of ordinary skill in the art, including within measurement error, within conventional rounding, or still another estimation or approximation that would be routinely applied.

As can also be noted from the drawings, bowl max radius dimension 96 may be defined at a location that is axially between cone peak 92 and bowl floor 84. A reentrancy angle 104 defined between upper wall surface 108 and piston rim 68 may be from 25° to 45°. Also, it will be appreciated bowl edge 88 is formed at an intersection of reentrant bowl wall 86, more specifically upper wall surface 108, and piston rim 68. Bowl edge 88 may define a radius of curvature 102 of at least 2 millimeters. A wall thickness 106 may be defined between combustion bowl 70 and a backside oil gallery surface 110. In an implementation, thickness 106 defined between surface 110 and surface 94 is greater than radius of curvature 102, and may be 2.5 millimeters or greater.

INDUSTRIAL APPLICABILITY

Referring now to the drawings generally, operating engine system 10 and engine 12 may include moving piston 18 in a compression stroke toward a top-dead-center position in cylinder 16 in engine 12. A gaseous hydrogen fuel may be directly injected into cylinder 16 in an injection path targeting center cone 72 in combustion bowl 70. At least at some point between the bottom-dead-center position and the top-dead-center position of piston 18 an axis of the one or more fuel holes will be pointed at center cone 72. The injected gaseous hydrogen fuel may be impinged upon cone slope or outer cone surface 94, in a glancing spray jet pattern, and advanced downwardly, outwardly, and then upwardly around reentrant bowl wall 86. Meanwhile, squished fluids as shown at 81 in FIG. 3 are advanced from squish volume 25 between piston rim 68 and cylinder head 22, assisting in producing a circulating combined mixing flow around flow axis 82.

In this generally manner, it is believed that improved mixing by way of pseudo-tumbling flow of mixing fuel and air can be achieved. It will be recalled fireside surface 23 may be planar, and the pseudo-tumbling flow can be achieved without requiring a pent roof or hemispheric or other non-planar cylinder head design. The mixed fuel and air is ignited typically by way of spark-ignition at a desired ignition timing, using a sparkplug positioned within cylinder 16, and potentially by way of a prechamber sparkplug where a spark gap is defined within a prechamber. Operation of an engine utilizing piston 218 and fuel injector 252 can take place in a manner generally analogous to that described.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:
   moving a piston defining a piston center axis in a compression stroke toward a top-dead-center position in a cylinder in the engine;
   directly injecting a gaseous hydrogen fuel into the cylinder in an injection path targeting a center cone in a combustion bowl of the piston defining a bowl max radius dimension;
   impinging the gaseous hydrogen fuel upon an outer cone surface of the center cone;
   advancing fluids including impinged gaseous hydrogen fuel upwardly from a bowl floor along a reentrant bowl wall toward a bowl throat opening defining a throat radius dimension that is from 50% to 80% of the bowl max radius dimension;
   advancing squished fluids from a squish volume between a piston rim of the piston and a cylinder head of the engine into the bowl throat opening; and
   producing a combined mixing flow of the advanced fluids and the squished fluids around a flow axis extending within the combustion bowl circumferentially around the piston center axis.

2. The method of claim 1 wherein the piston defines a piston radius dimension, and the throat radius dimension is from 40% to 70% of the piston radius dimension.

3. The method of claim 1 wherein the piston includes a piston rim that is planar and extends from an outer piston surface to a bowl edge defining the bowl throat opening.

4. The method of claim 3 wherein a reentrancy angle from 25° to 45° is defined between the reentrant bowl wall and the piston rim.

5. The method of claim 4 wherein the bowl edge defines an edge radius of 2 mm or greater.

6. The method of claim 1 wherein the injection path targets a slope of the center cone including the outer cone surface.

7. The method of claim 6 wherein the directly injecting a gaseous hydrogen fuel includes directly injecting the gaseous hydrogen fuel through a plurality of injection holes.

8. The method of claim 6 wherein the directly injecting a gaseous hydrogen fuel includes directly injecting the gaseous hydrogen fuel through a total of one injection hole.

9. The method of claim 6 wherein the cylinder head includes a fireside surface that is planar and exposed to the cylinder.

10. An engine system comprising:
a gaseous fuel supply;
an engine housing forming a cylinder;
a piston within the cylinder movable between a bottom-dead-center position and a top-dead-center position, the piston defining a piston center axis and including a piston rim extending circumferentially around a combustion bowl, a center cone within the combustion bowl, a bowl floor, and a reentrant bowl wall extending to a bowl edge extending from the bowl outer wall to the piston rim and defining a bowl throat opening to admit a fuel and air from a space defined above the piston rim directly into the combustion bowl, and the piston defining a bowl max radius dimension and a bowl throat radius dimension that is from 50% to 80% of the bowl max radius dimension; and
a fuel injector fluid coupled to the gaseous fuel supply and extending into the cylinder, and the fuel injector including at least one fuel outlet hole oriented to target the center cone of the piston.

11. The engine system of claim 10 wherein the gaseous fuel supply includes a gaseous hydrogen fuel supply.

12. The engine system of claim 10 wherein engine housing includes a cylinder head having a fireside surface that is planar and exposed to the cylinder.

13. The engine system of claim 10 wherein the piston defines a piston radius dimension, and the throat radius dimension is from 40% to 70% of the piston radius dimension.

14. The engine system of claim 13 wherein the piston rim extends planarly to the bowl edge, and a reentrancy angle from 25° to 45° is defined between the reentrant bowl wall and the piston rim.

15. The engine system of claim 13 wherein the bowl edge is formed at an intersection of the reentrant bowl wall and the piston rim and defines a radius of curvature of at least 2 mm.

16. The engine system of claim 10 wherein the fuel injector includes a total of one fuel outlet hole.

17. A piston for an internal combustion engine comprising:
a piston crown including a piston outer surface extending circumferentially around a piston center axis, and a piston rim extending circumferentially around a combustion bowl, a center cone within the combustion bowl, a bowl floor, and a bowl outer wall extending reentrantly to a bowl edge extending from the bowl outer wall to the piston rim and defining a bowl throat opening to admit a fuel and air from a space defined above the piston rim directly into the combustion bowl;
the piston defining a bowl max radius dimension extending from the piston center axis to the bowl outer wall, a throat radius dimension extending from the piston center axis to the bowl edge, and a piston radius dimension; and
the throat radius dimension is from 50% to 80% of the bowl max radius dimension, and from 40% to 70% of the piston radius dimension.

18. The piston of claim 17 wherein the bowl max radius dimension is defined at a location that is axially between a peak of the center cone and the bowl floor.

19. The piston of claim 17 wherein:
the bowl edge defines a radius of curvature of 2 mm or greater; and
the center cone includes a cone surface, and the piston crown includes a backside oil gallery surface opposite to the cone surface, and a thickness defined between the cone surface and the backside oil gallery surface is 2.5 mm or greater.

20. The piston of claim 17 wherein the piston rim is planar.

* * * * *